(12) United States Patent
Jeong

(10) Patent No.: US 12,362,619 B2
(45) Date of Patent: Jul. 15, 2025

(54) MOTOR WITH FIRST AND SECOND CONNECTOR UNEQUALLY LOCATED FROM ROTOR AND STATOR CENTER

(71) Applicant: LG INNOTEK CO., LTD., Seoul (KR)

(72) Inventor: Won Seo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 475 days.

(21) Appl. No.: 17/753,164

(22) PCT Filed: Jun. 11, 2020

(86) PCT No.: PCT/KR2020/007590
§ 371 (c)(1),
(2) Date: Feb. 22, 2022

(87) PCT Pub. No.: WO2021/033896
PCT Pub. Date: Feb. 25, 2021

(65) Prior Publication Data
US 2022/0286009 A1   Sep. 8, 2022

(30) Foreign Application Priority Data
Aug. 22, 2019   (KR) .................. 10-2019-0103010

(51) Int. Cl.
*H02K 3/52*   (2006.01)
*H02K 5/22*   (2006.01)

(52) U.S. Cl.
CPC ............ *H02K 3/522* (2013.01); *H02K 5/225* (2013.01); *H02K 2203/09* (2013.01)

(58) Field of Classification Search
CPC ............................... H02K 3/522; H02K 5/225
(Continued)

(56) References Cited

U.S. PATENT DOCUMENTS

2016/0149454 A1* 5/2016 Haga ................... H02K 3/28
310/71
2018/0241272 A1* 8/2018 Asahi ............. H02K 15/0068

FOREIGN PATENT DOCUMENTS

EP      300 218 A1    3/2018
JP      11-97956 A    4/1999
(Continued)

OTHER PUBLICATIONS

WO2019065584A1 English translation (Year: 2024).*
(Continued)

*Primary Examiner* — Christopher M Koehler
*Assistant Examiner* — Viswanathan Subramanian
(74) *Attorney, Agent, or Firm* — Saliwanchik, Lloyd & Eisenschenk

(57) ABSTRACT

The present invention provides a motor including a stator, a housing disposed outside the stator, a busbar disposed on an upper side of the stator, and a connector connected to the busbar, wherein the stator includes a stator core, an insulator disposed on the stator core, and a coil disposed on the insulator, the busbar includes a first terminal and a second terminal which are connected to the coil of the stator and separated from each other in a circuit manner, the connector includes a first connector fused to the first terminal and a second connector fused to the second terminal, each of the first connector and the second connector includes a connector body seated in the housing and a power terminal inserted into the connector body and fused to the first terminal or the second terminal, the power terminal includes a first embossing in contact with the second terminal and a second embossing in contact with the first terminal, and the first embossing is disposed closer to a center of the stator than the second embossing.

7 Claims, 11 Drawing Sheets

(58) Field of Classification Search
USPC .......................................................... 310/71
See application file for complete search history.

(56) References Cited

FOREIGN PATENT DOCUMENTS

| JP | 2004-104884 A | 4/2004 |
| JP | 3524356 B2 | 5/2004 |
| JP | 2009-105782 A | 5/2009 |
| JP | 2011-205877 A | 10/2011 |
| JP | 2012-64649 A | 3/2012 |
| JP | 2016-101035 A | 5/2016 |
| JP | 2019-41507 A | 3/2019 |
| JP | 2019-115123 A | 7/2019 |
| KR | 10-2011-0077819 A | 7/2011 |
| KR | 10-2015-0080400 A | 7/2015 |
| KR | 10-2016-0123143 A | 10/2016 |
| KR | 10-2017-0102018 A | 9/2017 |
| KR | 10-2019-0013045 A | 2/2019 |
| WO | 2014/041265 A2 | 3/2014 |
| WO | 2016/167488 A1 | 10/2016 |
| WO | 2017/026412 A1 | 2/2017 |
| WO | 2017/065140 A1 | 4/2017 |
| WO | 2019/065584 A1 | 4/2019 |

OTHER PUBLICATIONS

JP2019115123A English translation (Year: 2024).*
Office Action dated Aug. 16, 2023 in Korean Application No. 10-2022-0018728.
Supplementary European Search Report dated Oct. 17, 2022 in European Application No. 20854237.3.
Office Action dated Jan. 9, 2024 in Japanese Application No. 2022-511390.
International Search Report dated Sep. 18, 2020 in International Application No. PCT/KR2020/007590.

* cited by examiner

MOTOR WITH FIRST AND SECOND CONNECTOR UNEQUALLY LOCATED FROM ROTOR AND STATOR CENTER

CROSS-REFERENCE TO RELATED APPLICATIONS

This application is the U.S. national stage application of International Patent Application No. PCT/KR2020/007590, filed Jun. 11, 2020, which claims the benefit under 35 U.S.C. § 119 of Korean Application No. 10-2019-0103010, filed Aug. 22, 2019, the disclosures of each of which are incorporated herein by reference in their entirety.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. An EPS system controls a vehicle's steering shaft to be driven by driving a motor using an electronic control unit (ECU) according to driving conditions detected by a vehicle speed sensor, a torque angle sensor, a torque sensor, and the like.

A motor includes a rotor and a stator. A coil is wound around the stator. A connection end of the coil wound around the stator may be connected to a busbar. The busbar includes a body and a terminal. The terminal is connected to the connection end of the coil. In addition, the terminal may be connected to an external power source through a cable.

The terminal may be formed to have a combination of phase terminals connected to U-phase, V-phase, and W-phase power sources and a neutral terminal. In this case, two terminals combined as described above may be disposed, and the two terminals may be separated from each other in a circuit manner to secure safety of the motor. When an abnormality occurs in the circuit or an element connected to any one terminal, the motor can be driven through another terminal. The two terminals are spatially separated from each other on a body of the busbar.

The terminal includes a busbar terminal connected to a stator coil and a power terminal which is fused to the busbar terminal and through which external power is applied. In this case, when the busbar terminal and the power terminal are fused, there are problems in that a fused portion is deformed, and a contact failure occurs while a temperature increases to be greater than or equal to a melting point of Ni constituting the terminal.

DISCLOSURE

Technical Problem

The present invention is directed to providing a motor in which bonding of a fused portion of a terminal and fusing quality are improved.

Objectives that have to be solved according to the present invention are not limited to the above-described objectives, and other objectives which are not described above will be clearly understood by those skilled in the art from the following specification.

Technical Solution

One aspect of the present invention provides a motor including a stator, a housing disposed outside the stator, a busbar disposed on an upper side of the stator, and a connector connected to the busbar, wherein the stator includes a stator core, an insulator disposed on the stator core, and a coil disposed on the insulator, the busbar includes a first terminal and a second terminal which are connected to the coil of the stator and separated from each other in a circuit manner, the connector includes a first connector fused to the first terminal and a second connector fused to the second terminal, each of the first connector and the second connector includes a first embossing and a second embossing disposed farther from a center of the stator than the first embossing, the first terminal is in contact with the second embossing of the first connector, and the second terminal is in contact with the first embossing of the second connector.

Each of the first connector and the second connector may include a connector body seated in the housing and a power terminal inserted into the connector body and fused to the first terminal or the second terminal, and the first embossing and the second embossing may be formed on the power terminal.

The housing may include a first seating surface on which the first connector is seated and a second seating surface on which the second connector is seated, and the first seating surface and the second seating surface are disposed at intervals of 180° based on a center of a rotor.

A longest distance between the center of the stator and the first seating surface may be shorter than a longest distance between the center of the stator and the second seating surface.

The power terminal may include a power connection part connected to a power source and a fusing portion which is bent from a lower end of the power connection part toward the center of the stator and fused to the first terminal or the second terminal, and the first embossing and the second embossing may be disposed on a side surface of the fusing portion.

A center of the first terminal in a width direction may be in contact with a most protruding point of the second embossing, and a center of the second terminal in a width direction may be in contact with a most protruding point of the first embossing.

The first terminal may not be in contact with the first embossing, and the second terminal may not be in contact with the second embossing.

The insulator may include a body around which the coil is wound and a guide extending from one side of the body, a first groove and a second groove spaced apart from the first groove in a circumferential direction may be formed in an inner surface of the guide, and the coil may be disposed in the first groove and the second groove in an axial direction.

The first groove and the second groove may be formed from an upper side of the body to an upper end of the guide.

The second groove may have a curvature facing outward, and the curvature of the second groove may increase in a circumferential direction away from the body.

On the basis of a virtual line passing through the center of the stator and a width center of the body, a distance from the second groove to the virtual line may be greater than a distance from the first groove to the virtual line.

The first groove may overlap the body in a radial direction, and the second groove may not overlap the body in the radial direction.

Advantageous Effects

According to embodiments, bonding of a terminal of a busbar and a power terminal can be improved, and fusing quality can be improved due to an embossing.

According to embodiments, separation of a coil guided by the busbar is reduced, and fusing accuracy between the terminal of the busbar and the coil can be improved.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In the description of the invention, when it is determined that detailed descriptions of related well-known technologies unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes combinations or any one of a plurality of associated listed items.

Figure 1:
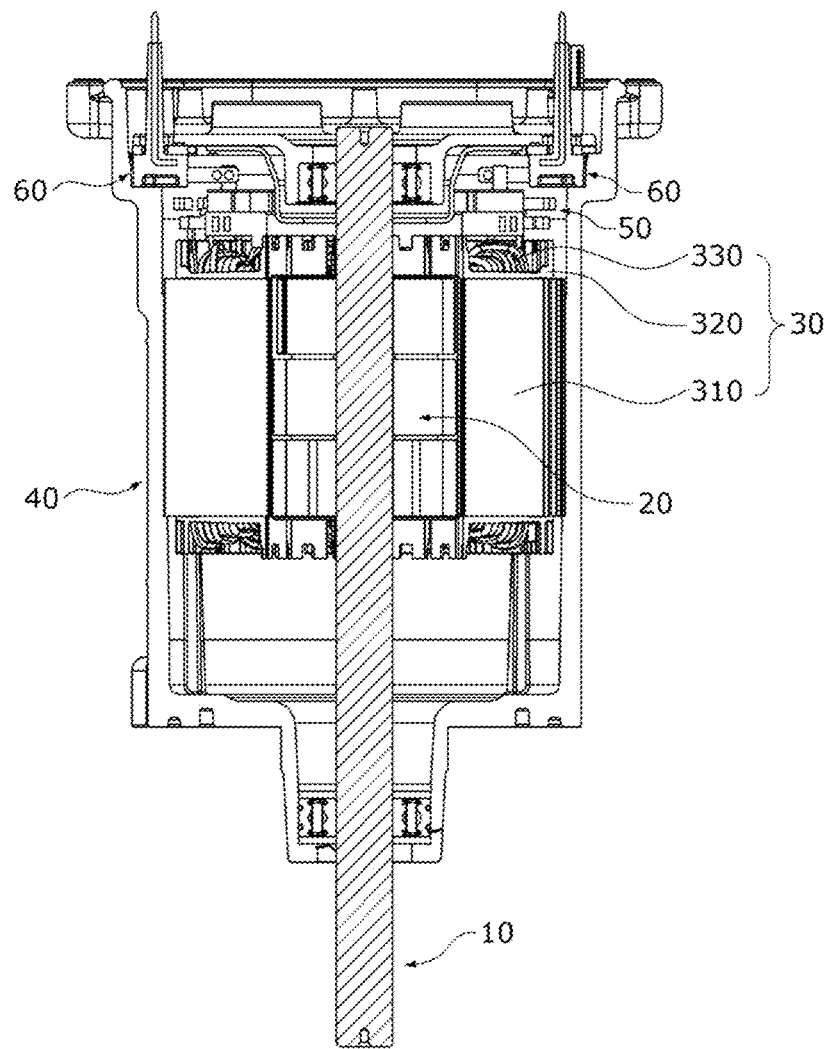
FIG. 1 is a side cross-sectional view illustrating a motor according to an embodiment.

FIG. 1 is a side cross-sectional view illustrating a motor according to an embodiment.

Referring to FIG. 1, a motor according to the embodiment may include a shaft 10, a rotor 20, a stator 30, a housing 40, a busbar 50, and a connector 60.

The shaft 10 may be coupled to the rotor 20. When an electromagnetic interaction occurs between the rotor 20 and the stator 30 due to the supply of a current, the rotor 20 rotates, and the shaft 10 rotates in conjunction with the rotor 20. The shaft 10 may be connected to a vehicle's steering shaft, and power may be transmitted to the vehicle's steering shaft.

The rotor 20 rotates due to the electrical interaction with the stator 30.

The rotor 20 may include a rotor core and magnets. The rotor core may be formed in a form in which a plurality of circular thin steel plates are stacked, or in a single cylindrical form. A hole coupled to the shaft 10 may be disposed at a center of the rotor core. Protrusions which guide the magnets may protrude from an outer circumferential surface of the rotor core. The magnets may be attached to the outer circumferential surface of the rotor core. The plurality of magnets may be disposed along a circumference of the rotor core at predetermined intervals. The rotor 20 may include a can member which fixedly surrounds the magnets to inhibit the magnets from being separated from the rotor core and from being exposed.

The stator 30 may include a stator core 310, an insulator 320, and a coil 330. The insulator 320 is installed on the stator core 310. The coil 330 is wound around the insulator 320. When power is applied, an induced current is generated in the coil 330. The coil 330 induces an electrical interaction with the rotor 20.

The housing 40 may accommodate the rotor 20 and the stator 30 therein. The housing 40 is formed in a cylindrical shape.

The busbar 50 may be disposed on the stator 30. The busbar 50 may include a terminal and a busbar body which insulates the terminal.

The connector 60 is connected to the busbar 50. In this case, the connector 60 is electrically connected to the terminal of the busbar 50. The connector 60 is connected to U-phase, V-phase, W-phase power sources.

Figure 2:
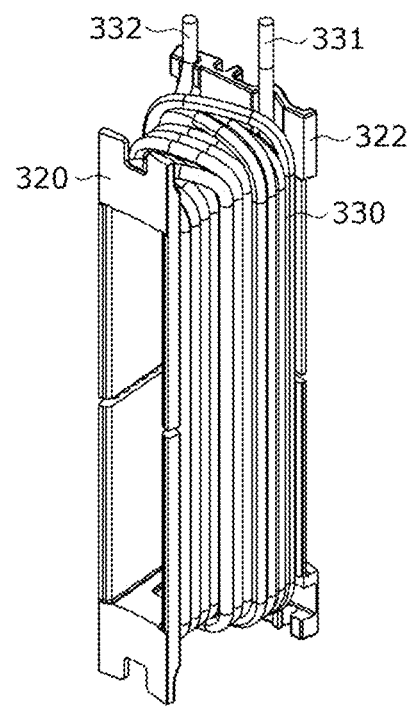
FIG. 2 is a perspective view illustrating a state in which a coil is wound around an insulator.
Figure 3:
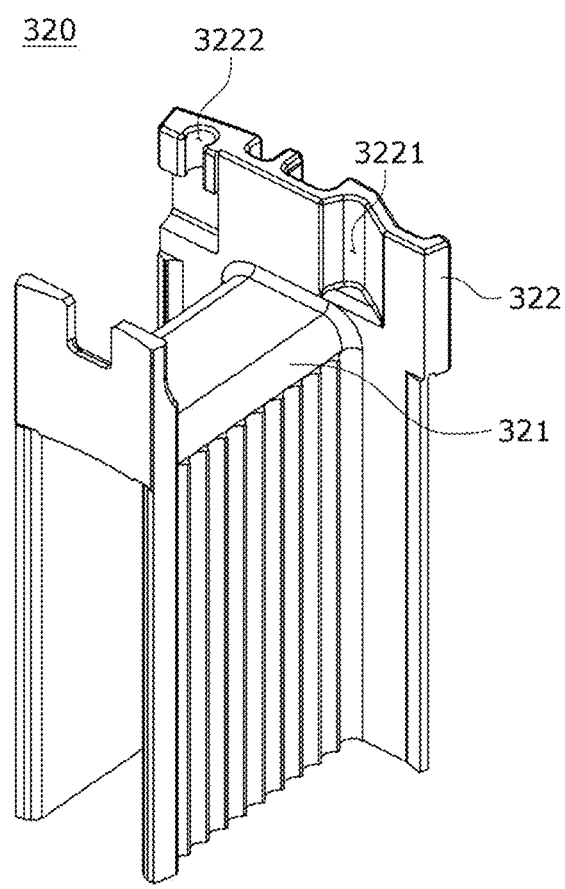
FIG. 3 is a perspective view illustrating the insulator.
Figure 4:
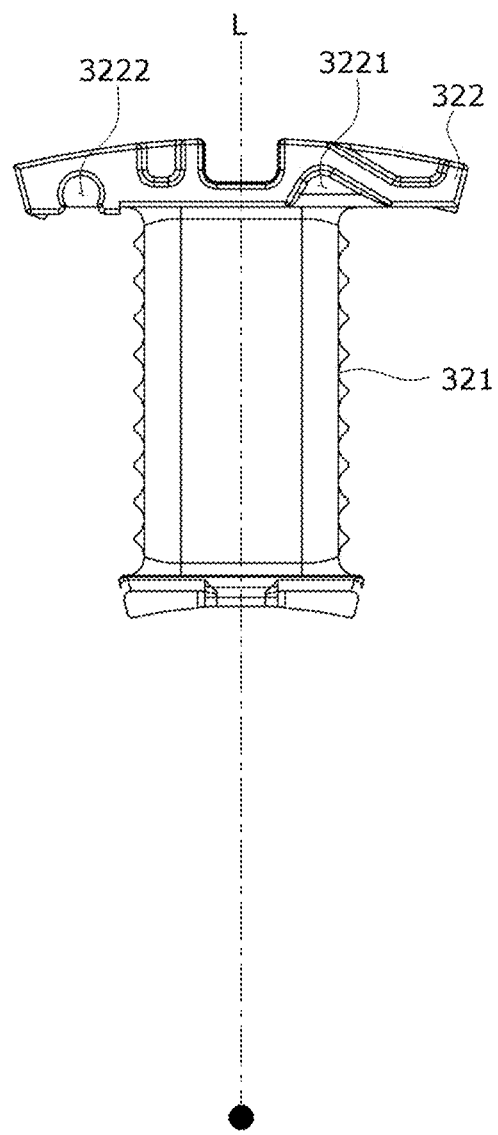
FIG. 4 is a plan view illustrating the insulator.
Figure 5:
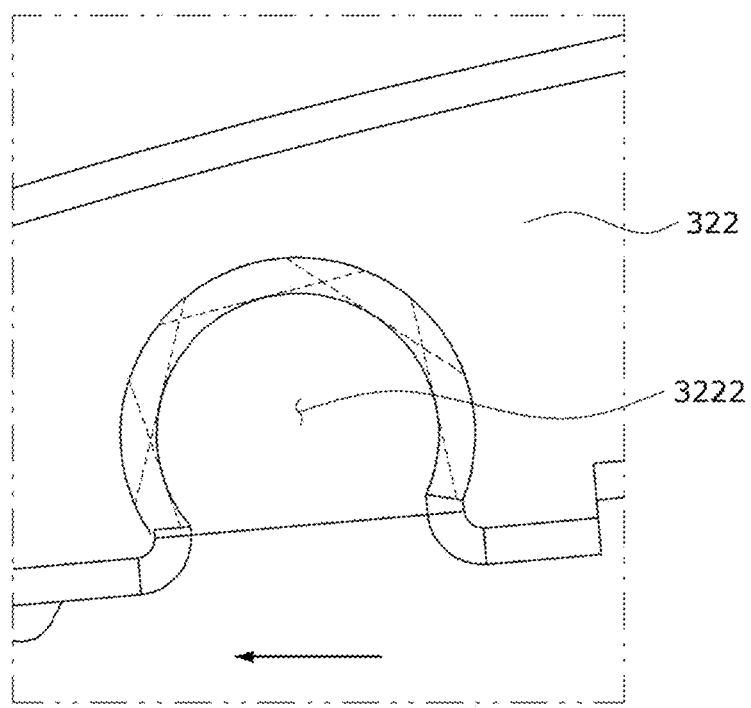
FIG. 5 is a partially enlarged view illustrating a second groove.

FIG. 2 is a perspective view illustrating a state in which the coil is wound around the insulator, FIG. 3 is a perspective view illustrating the insulator, FIG. 4 is a plan view illustrating the insulator, and FIG. 5 is a partially enlarged view illustrating a second groove.

The insulator 320 is installed on the stator core 310.

Referring to FIG. 2, the insulator 320 may include a body 321 and a guide 322. The body 321 is a portion around which the coil 330 is wound when disposed. In addition, the guide 322 is disposed to extend upward at an outside of the body 321.

Referring to FIG. 3, a first groove 3221 and a second groove 3222 may be formed in an inner surface of the guide 322. A start end 331 and a stop end 332 of the coil 330 may be disposed in the first groove 3221 and the second groove 3222.

Referring to FIG. 4, the first groove 3221 and the second groove 3222 are spaced apart from each other in a circumferential direction. In this case, the first groove 3221 and the second groove 3222 may be formed from an upper side of the body 321 to an upper end of the guide 322. A shape of the first groove 3221 and a shape of the second groove 3222 may be different from each other.

The start end 331 of the coil 330 wound around the insulator 320 is disposed in the first groove 3221. That is, winding of the coil 330 may start from the first groove 3221 formed in the insulator 320. In this case, at a side of the body 321, a width of the first groove 3221 may be greater than a width of the second groove 3222. In addition, the first groove 3221 may be disposed to be closer to the body 321 than the second groove 3222. In this case, at least a part of the first groove 3221 may overlap the body 321 in a radial direction.

Conversely, the stop end 332 of the coil 330 wound around the insulator 320 is disposed in the second groove 3222. That is, the winding of the coil 330 may end in the second groove 3222 formed in the insulator 320. At the side of the body 321, the width of the second groove 3222 may be smaller than the width of the first groove 3221. In addition, the second groove 3222 may be disposed farther from the body 321 than the first groove 3221. Preferably, when it is assumed that a virtual line L passes through a rotor center C and a width center of the body 321, a distance from the second groove 3222 to the virtual line L may be greater than a distance from the first groove 3221 to the virtual line L. In this case, the second groove 3222 may not overlap the body 321 in the radial direction.

Referring to FIG. 5, a curvature of the second groove 3222 may vary in the circumferential direction. In this case, the curvature of the second groove 3222 may increase in a direction away from the body 321. In addition, the second groove 3222 may be formed to correspond to a shape of a cross section of the stop end 332 of the coil 330.

Figure 6:
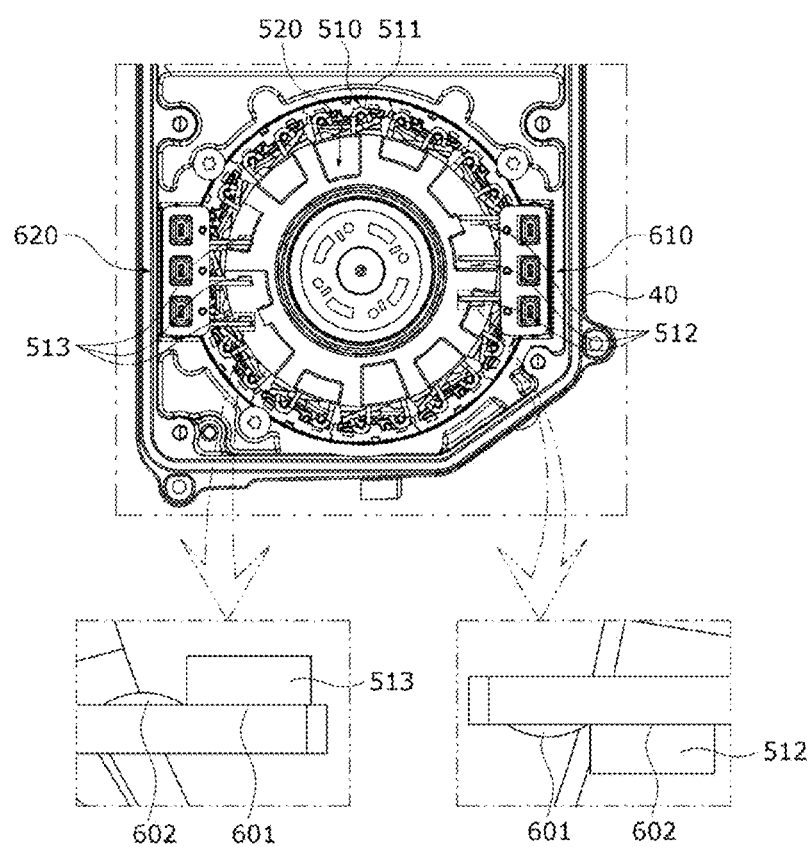
FIG. 6 is a plan view illustrating a state in which a first connector and a second connector are seated in a housing.

FIG. 6 is a plan view illustrating a state in which a first connector and a second connector are seated in a housing.

Referring to FIG. 6, the busbar 50 may include a terminal 510 to apply a current to the coil of the stator and a busbar body 520 formed of an insulation material. In this case, the terminal 510 may include a plurality of first terminals (not shown) and a plurality of second terminals (not shown).

The first terminal (not shown) and the second terminal (not shown) are electrically connected to the coil 330 of the stator 30. In this case, the first terminal (not shown) and the second terminal (not shown) are separated from each other in a circuit manner. In this case, a layout of the first terminal (not shown) and the second terminal (not shown) is not limited and may vary.

The first terminal (not shown) and the second terminal (not shown) may include terminal bodies (not shown), protruding parts 511, and power parts 512 and 513. In this case, the terminal body (not shown) is disposed in the busbar body 520. In addition, the protruding parts 511 and the power parts 512 and 513 may be formed to extend from the terminal body (not shown).

The protruding parts 511 may protrude outward from the terminal body in the radial direction. In this case, the protruding parts 511 may be exposed from a side surface of the busbar body 520. In addition, the protruding parts 511 are electrically connected to the coil 330. The protruding parts 511 may be fused to the stop end 332 of the coil 330.

Meanwhile, the power parts 512 and 513 may extend upward from the terminal bodies. In this case, the power parts 512 and 513 may be exposed from an upper surface of the busbar body 520. In addition, the power parts 512 and 513 are electrically connected to the connector 60. In this case, the power parts 512 and 513 may be fused to the connector 60.

Power is individually applied to the first terminal (not shown) and the second terminal (not shown) through the connector 60. To this end, the connector 60 may include a first connector 610 and a second connector 620.

The first connector 610 is disposed at a side of the power part 512 of the first terminal. In addition, the first connector 610 is fused to the power part 512 of the first terminal. In this case, the power may be supplied through the first connector 610 and the first terminal so that an induced current may be generated in the coil 330 of half of the stator 30.

Meanwhile, the second connector 620 is disposed at a side of the power part 513 of the second terminal. In addition, the second connector 620 is fused to the power part 513 of the second terminal. In this case, the power may be supplied through the second connector 620 and the second terminal so that an induced current may be generated in the coil 330 of the remaining half of the stator 30. Accordingly, even when the current supplied through either of the first connector 610 and the second connector 620 is stopped, the power supplied through the remaining one of the second connector 620 and the first connector 610 is continued so that a half region of the stator 30 may be driven.

Figure 7:
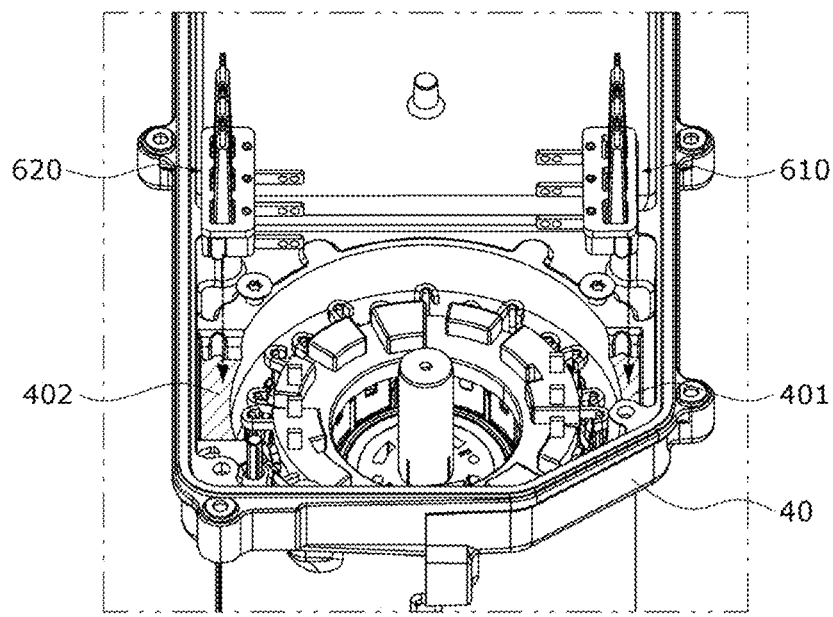
FIG. 7 is a perspective view illustrating the state in which the first connector and the second connector are being seated in the housing.
Figure 8:
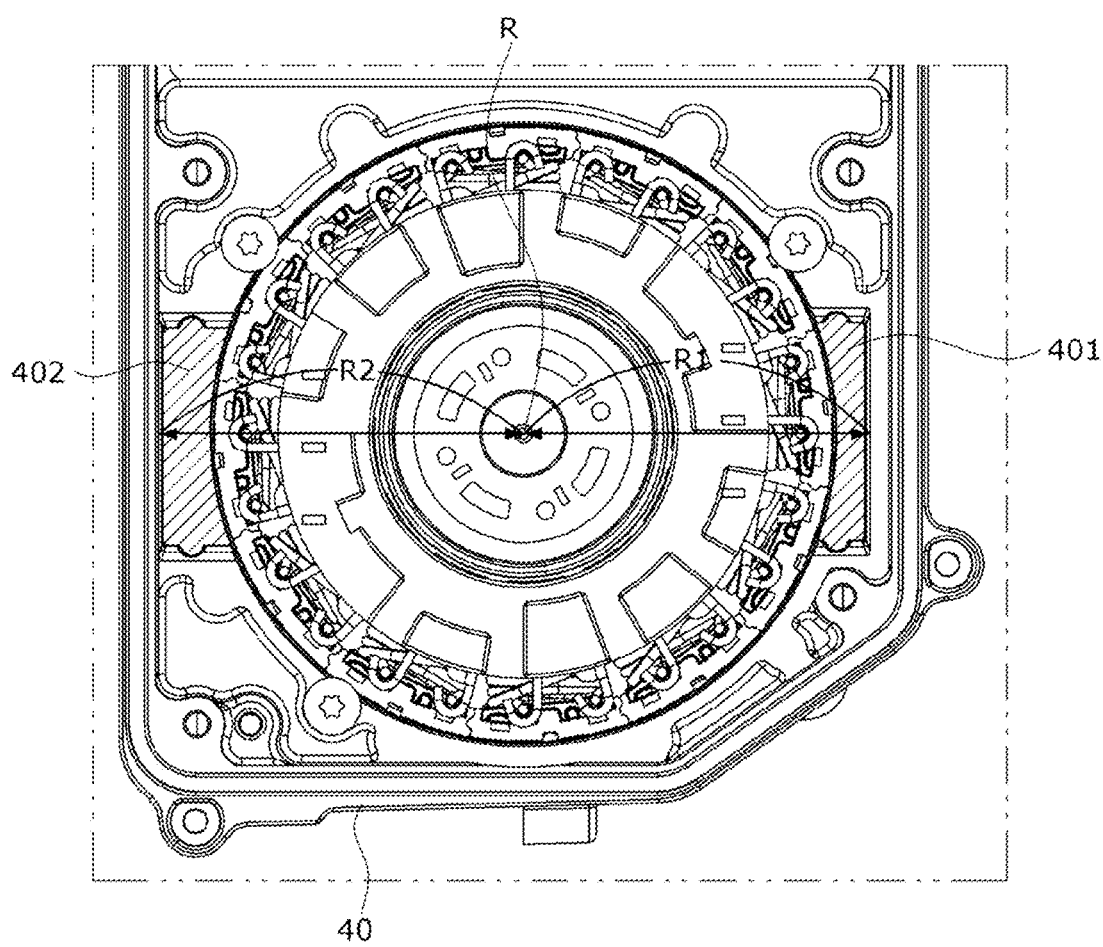
FIG. 8 is a plan view illustrating a state in which the housing is disposed on a stator.

FIG. 7 is a perspective view illustrating the state in which the first connector and the second connector are being seated in the housing, and FIG. 8 is a plan view illustrating a state in which the housing is disposed on a stator.

Referring to FIGS. 7 and 8, the first connector 610 and the second connector 620 are seated in the housing 40. In this case, a first seating surface 401 on which the first connector 610 is seated is formed at one side of the housing 40. In addition, a second seating surface 402 on which the second connector 620 is seated is formed at the other side of the housing 40. The first seating surface 401 and the second seating surface 402 may be disposed at intervals of 180° based on the rotor center C.

In this case, a longest distance R1 between the rotor center C and the first seating surface 401 may be different from a longest distance R2 between the rotor center C and the second seating surface 402. In this case, the longest distance R1 from the rotor center C to the first seating surface 401 may be shorter than the longest distance R2 from the rotor center C to the second seating surface 402.

Figure 9:
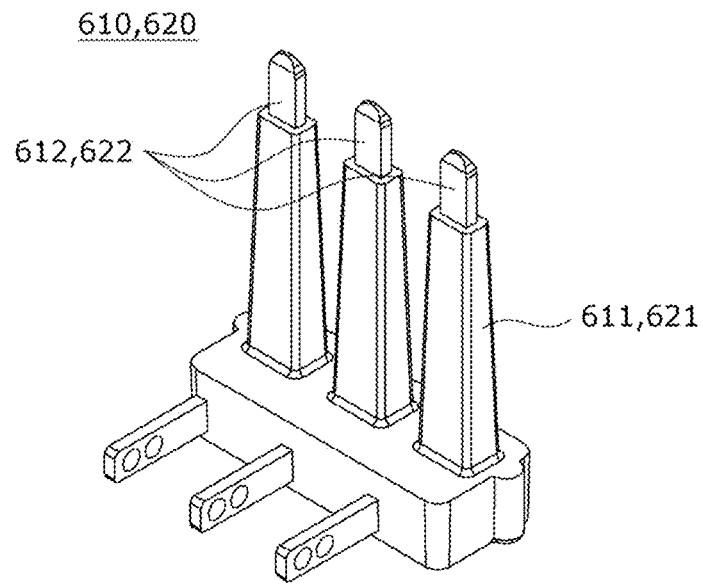
FIG. 9 is a view illustrating the first connector and the second connector.

FIG. 9 is a view illustrating the first connector and the second connector.

A shape of the first connector 610 is the same as a shape of the second connector 620.

Referring to FIG. 9, the first connector 610 and the second connector 620 may include bodies 611 and 621 and plurality of power terminals 612 and 622.

The bodies 611 and 621 are seated in the housing 40. In this case, the body 611 of the first connector 610 is in contact with the first seating surface 401, and the body 621 of the second connector 620 is in contact with the second seating surface 402.

The power terminals 612 and 622 are coupled to the bodies 611 and 621. The power terminal 612 may be provided as three power terminals 612, and the power terminal 622 may be provided as three power terminals 622. The power terminals 612 and 622 are connected to U-phase, V-phase, and W-phase power sources. In this case, each of the power terminals 612 and 622 is connected to one of the first terminal and the second terminal in a fusing manner.

Figure 10:
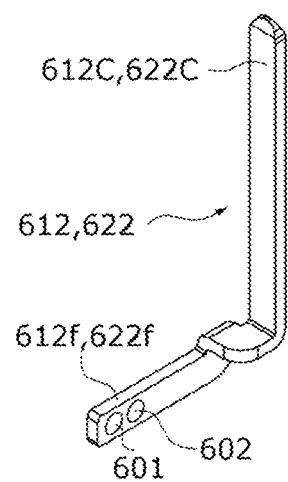
FIG. 10 is a perspective view illustrating a power terminal.

FIG. 10 is a perspective view illustrating the power terminal.

A material and a shape of the power terminal 612 of the first connector 610 are the same as a material and a shape of the power terminal 622 of the second connector 620.

Referring to FIG. 10, the power terminals 612 and 622 may include power connection parts 612C and 622C and fusing portions 612f and 622f.

The power connection parts 612C and 622C are connected to the U-phase, V-phase, and W-phase power sources. The power connection parts 612C and 622C may be formed to extend in an axial direction. In addition, the fusing portions 612f and 622f extend from lower end portions of the power connection parts 612C and 622C.

The fusing portions 612f and 622f may be disposed to be bent from the power connection parts 612C and 622C. In this case, at least one bent portions may be formed between the fusing portions 612f and 622f and the power connection parts 612C and 622C. In this case, in the fusing portions 612f and 622f, widths in a vertical direction may be greater than widths in a horizontal direction. Areas of upper and lower surfaces of the fusing portions 612f and 622f may be greater than areas of side surfaces thereof.

The fusing portions 612f and 622f may protrude inward from the power connection parts 612C and 622C in the radial direction.

In addition, the fusing portions 612f and 622f may be fused to the power parts 512 and 513 of the first terminal or the second terminal. In this case, the side surfaces of the fusing portions 612f and 622f may be fused to the power parts 512 and 513 of the first terminal or the second terminal. The side surface of each of the fusing portions 612f and 622f fused to the power parts 512 and 513 may include at least one of embossings 601 and 602.

The embossings 601 and 602 may include a first embossing 601 and a second embossing 602. The first embossing 601 and the second embossing 602 may be spaced apart from each other in the radial direction. In this case, the first embossing 601 may be disposed closer to a stator center than the second embossing 602. In addition, the second embossing 602 may be disposed closer to the body 611 or 621 than the first embossing 601.

Figure 11:
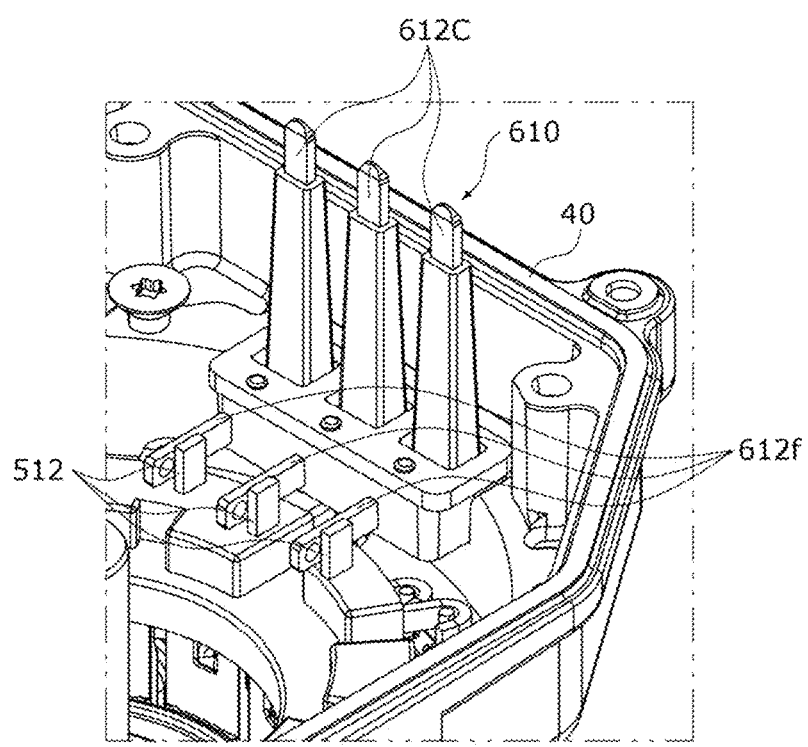
FIG. 11 is a view illustrating a fused portion of a first terminal and the first connector.
Figure 12:
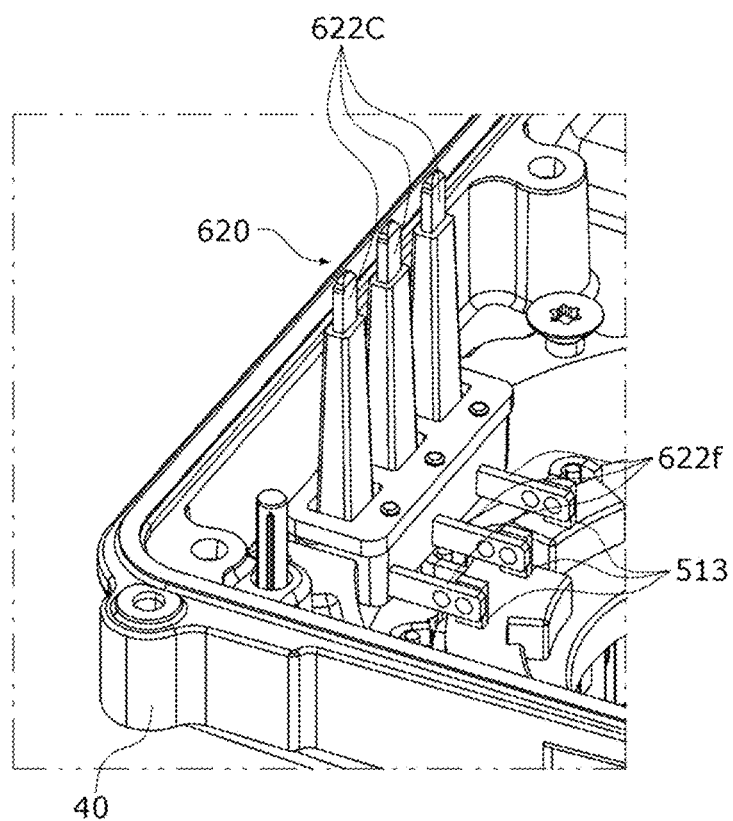
FIG. 12 is a view illustrating a fused portion of a second terminal and the second connector.

FIG. 6 is a plan view illustrating the state in which the first connector and the second connector are seated in the housing, FIG. 8 is a plan view illustrating the state in which the housing is disposed on the stator, FIG. 11 is a view illustrating the fused portion of the first terminal and the first connector, and FIG. 12 is a view illustrating a fused portion area of the second terminal and the second connector.

Referring to FIG. 8, a longest distance from the rotor center C to the first seating surface 401 and a longest distance from the rotor center C to the second seating surface 402 are different. Accordingly, a distance from the rotor center C to the fusing portion 612f of the first connector 610 and a distance from the rotor center C to the fusing portion 622f of the second connector 620 may be different. Meanwhile, a distance from the rotor center C to the power part 512 of the first terminal and a distance from the rotor center C to the power part 513 of the second terminal may be the same. Accordingly, a fusing position of the fusing portion 612f of the first connector and a fusing position of the fusing portion 622f of the second connector may be different. For example, the fusing position of the fusing portion 622f of the second connector may be disposed closer to an end portion than the fusing position of the fusing portion 612f of the first connector.

Referring to FIGS. 6, 11, and 12, the power part 512 of the first terminal may be in contact with the second embossing 602 of the first connector 610. Meanwhile, the power part 513 of the second terminal may be in contact with the first embossing 601 of the second connector 620. In this case, the power part 512 of the first terminal may not be in contact with the first embossing 601, and the power part 513 of the second terminal may not be in contact with the second embossing 602.

The motor according to exemplary embodiments of the present invention has been specifically described above with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

REFERENCE NUMERALS

| | |
|---|---|
| 10: SHAFT | 20: ROTOR |
| 30: STATOR | 310: STATOR CORE |
| 320: INSULATOR | 320: COIL |
| 40: HOUSING | 50: BUSBAR |
| 60: CONNECTOR | 610: FIRST CONNECTOR |
| 620: SECOND CONNECTOR | |

The invention claimed is:

1. A motor comprising:
a stator;
a housing disposed outside the stator;
a busbar disposed on an upper side of the stator; and
a connector connected to the busbar,
wherein the stator includes a stator core, an insulator disposed on the stator core, and a coil disposed on the insulator,
wherein the busbar includes a first terminal and a second terminal that are connected to the coil of the stator and separated from each other in a circuit manner,
wherein the connector includes a first connector fused to the first terminal and a second connector fused to the second terminal, wherein the first connector and the second connector each includes a power terminal,
wherein a first embossing and a second embossing are formed on the power terminal,
wherein the first embossing is disposed closer to a center of the stator than is the second embossing,
wherein the second embossing of the power terminal of the first connector contacts the first terminal, and
wherein the first embossing of the power terminal of the second connector contacts the second terminal.

2. The motor of claim 1, wherein:
each of the first connector and the second connector includes a connector body seated in the housing and the power terminal inserted into the connector body.

3. The motor of claim 2, wherein:
the housing includes a first seating surface on which the first connector is seated and a second seating surface on which the second connector is seated; and
the first seating surface and the second seating surface are disposed apart from each other by 180° with respect to a center of a rotor.

4. The motor of claim 1, wherein:
the power terminal includes a power connection part connected to a power source and a fusing portion that is bent from a lower end of the power connection part toward the center of the stator and fused to the first terminal or the second terminal; and
the first embossing and the second embossing are disposed on a side surface of the fusing portion.

5. The motor of claim 4, wherein:
a center of the first terminal in a width direction is in contact with a most protruding point of the second embossing; and
a center of the second terminal in a width direction is in contact with a most protruding point of the first embossing.

6. A motor comprising:
a stator;
a housing disposed outside the stator;
a busbar disposed on an upper side of the stator; and
a connector connected to the busbar,
wherein the stator includes a stator core, an insulator disposed on the stator core, and a coil disposed on the insulator, wherein the busbar includes a first terminal and a second terminal that are connected to the coil of the stator and separated from each other in a circuit manner, wherein the connector includes a first connector fused to the first terminal and a second connector fused to the second terminal, wherein each of the first connector and the second connector includes a first embossing and a second embossing disposed farther from a center of the stator than the first embossing, wherein the first terminal is in contact with the second embossing of the first connector, and the second terminal is in contact with the first embossing of the second connector, wherein each of the first connector and the second connector includes a connector body seated in the housing and a power terminal inserted into the connector body and fused to the first terminal or the second terminal;

wherein the first embossing and the second embossing are formed on the power terminal, wherein the housing includes a first seating surface on which the first connector is seated and a second seating surface on which the second connector is seated and the first seating surface and the second seating surface are disposed apart from each other by 180° with respect to a center of a rotor, and wherein a longest distance between the center of the stator and the first seating surface is shorter than a longest distance between the center of the stator and the second seating surface.

7. A motor comprising:
a stator;
a housing disposed outside the stator;
a busbar disposed on an upper side of the stator; and
a connector connected to the busbar,
wherein the stator includes a stator core, an insulator disposed on the stator core, and a coil disposed on the insulator, wherein the busbar includes a first terminal and a second terminal that are connected to the coil of the stator and separated from each other in a circuit manner, wherein the connector includes a first connector fused to the first terminal and a second connector fused to the second terminal, wherein each of the first connector and the second connector includes a first embossing and a second embossing disposed farther from a center of the stator than the first embossing, wherein the first terminal is in contact with the second embossing of the first connector, and the second terminal is in contact with the first embossing of the second connector, wherein each of the first connector and the second connector includes a connector body seated in the housing and a power terminal inserted into the connector body and fused to the first terminal or the second terminal; and the first embossing and the second embossing are formed on the power terminal, wherein the power terminal includes a power connection part connected to a power source and a fusing portion which is bent from a lower end of the power connection part toward the center of the stator and fused to the first terminal or the second terminal; and the first embossing and the second embossing are disposed on a side surface of the fusing portion, wherein a center of the first terminal in a width direction is in contact with a most protruding point of the second embossing; and a center of the second terminal in a width direction is in contact with a most protruding point of the first embossing, wherein the first terminal is not in contact with the first embossing; and the second terminal is not in contact with the second embossing.

* * * * *